(12) United States Patent
Kovie et al.

(10) Patent No.: US 11,660,939 B2
(45) Date of Patent: May 30, 2023

(54) VEHICLE BODY STRUCTURE

(71) Applicant: Nissan North America, Inc., Franklin, TN (US)

(72) Inventors: David Kovie, Livonia, MI (US); Mahiuddin Ahmed, Troy, MI (US); Christopher Herrala, Milford, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 0 days.

(21) Appl. No.: 17/473,971

(22) Filed: Sep. 13, 2021

(65) Prior Publication Data

US 2023/0077789 A1 Mar. 16, 2023

(51) Int. Cl.
*B60J 5/04* (2006.01)
*E05B 77/04* (2014.01)

(52) U.S. Cl.
CPC .......... *B60J 5/0433* (2013.01); *B60J 5/0443* (2013.01); *B60J 5/0461* (2013.01); *E05B 77/04* (2013.01)

(58) Field of Classification Search
CPC ...... B60J 5/0433; B60J 5/0443; B60J 5/0461; B60J 5/0447; B60J 5/0456; E05B 77/04; B62D 21/157
USPC .......................................... 296/146.6, 187.12
See application file for complete search history.

(56) References Cited

U.S. PATENT DOCUMENTS

| | | | | |
|---|---|---|---|---|
| 5,785,376 A | * | 7/1998 | Nees | B60J 5/0444 49/502 |
| 6,205,714 B1 | * | 3/2001 | Staser | B60J 5/0429 49/502 |
| 6,390,534 B1 | * | 5/2002 | Lee | B60J 5/0437 49/502 |
| 6,817,652 B2 | * | 11/2004 | Graber | B60J 5/0447 296/187.02 |
| 8,414,038 B2 | * | 4/2013 | Bedekar | E05B 77/04 292/216 |
| 8,973,971 B1 | * | 3/2015 | Henke | B60J 5/0444 49/502 |
| 10,385,592 B2 | * | 8/2019 | Manolescu | E05B 77/06 |
| 2019/0128025 A1 | * | 5/2019 | Ishikawa | E05B 77/04 |
| 2019/0176586 A1 | * | 6/2019 | Choi | B60J 5/0425 |
| 2020/0384834 A1 | * | 12/2020 | Iozzo | B60J 5/042 |

* cited by examiner

*Primary Examiner* — Joseph D. Pape
*Assistant Examiner* — Veronica M Shull
(74) *Attorney, Agent, or Firm* — Global IP Counselors, LLP

(57) ABSTRACT

A vehicle body structure includes a door, a latch mechanism and a secondary reinforcement member (an attenuation member). The door has an inner door panel and a reinforcement member installed thereto the inner door panel. The latch mechanism is installed the inner door panel such that in a latching orientation the latch mechanism retains the door in the closed orientation and in a release orientation the door can move to the open orientation. A rearward portion of the reinforcement member is outboard and level with a portion of the latch mechanism. The secondary reinforcement member is fixedly attached to a central area of the reinforcement member spaced apart from the rearward area of the inner door panel and spaced apart from a forward area of the inner door panel. In response to an impact event, the reinforcement member deforms and contacts the latch mechanism preventing movement of the latch mechanism.

20 Claims, 10 Drawing Sheets

VEHICLE BODY STRUCTURE

BACKGROUND

Technical Field

The present disclosure generally relates to a vehicle body structure. More specifically, the present disclosure relates to a vehicle body structure with a door that includes a reinforcement member and an attenuation member (a secondary reinforcement member) that are configured to direct deformation of the reinforcement member during an impact event near a central area of the door to prevent a door latch mechanism from operating such that the door remains in a closed orientation during the impact event.

Background Information

Vehicle body structures, such as doors are provided with reinforcement members and latch mechanisms. In response to an impact event, a door of the vehicle can sometimes open.

SUMMARY

One object of the present disclosure is to provide a structure within a door that prevents a latch mechanism from operating so that the latch mechanism can continue retaining the door in a closed orientation during an impact event where the impact event applies impact force proximate a central area of the door.

Another object of the present disclosure is to provide a door with structure that prevents the door from opening during an impact event such that impacting force against the door can at least partially be transmitted to a B-pillar of a vehicle.

In view of the state of the known technology, one aspect of the present disclosure is to provide a vehicle body structure with a door structure, a latch mechanism and a secondary reinforcement member. The door structure has an inner door panel and a reinforcement member installed to the inner door panel. The door structure is movable to and from each of a closed orientation and an open orientation when installed to a vehicle. The latch mechanism is installed to a rearward area of the inner door panel. The latch mechanism is configured such that in a latching orientation the latch mechanism retains the door structure in the closed orientation and in a release orientation the door structure can move to the open orientation. The latch mechanism is positioned such that at least a section of a rearward portion of the reinforcement member is outboard and level with a portion of the latch mechanism. The secondary reinforcement member is fixedly attached to a central area of the reinforcement member spaced apart from the rearward area of the inner door panel and spaced apart from a forward area of the inner door panel. In response to an impact event where force is directed to a central area of the door structure, the reinforcement member deforms and contacts the latch mechanism retaining the latch mechanism in the latching orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
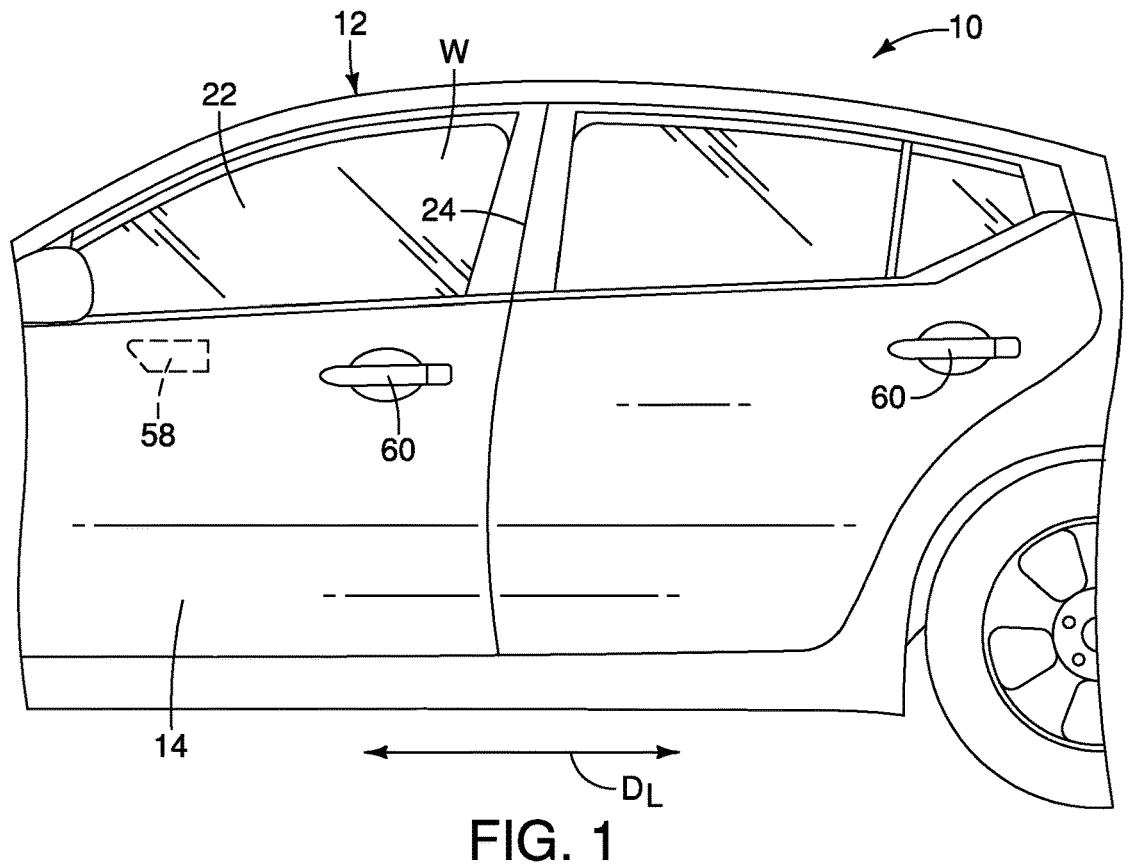
FIG. 1 is a side view of a vehicle that includes a door structure with a reinforcement member showing the door structure in a closed orientation in accordance with an exemplary embodiment.
Figure 2:
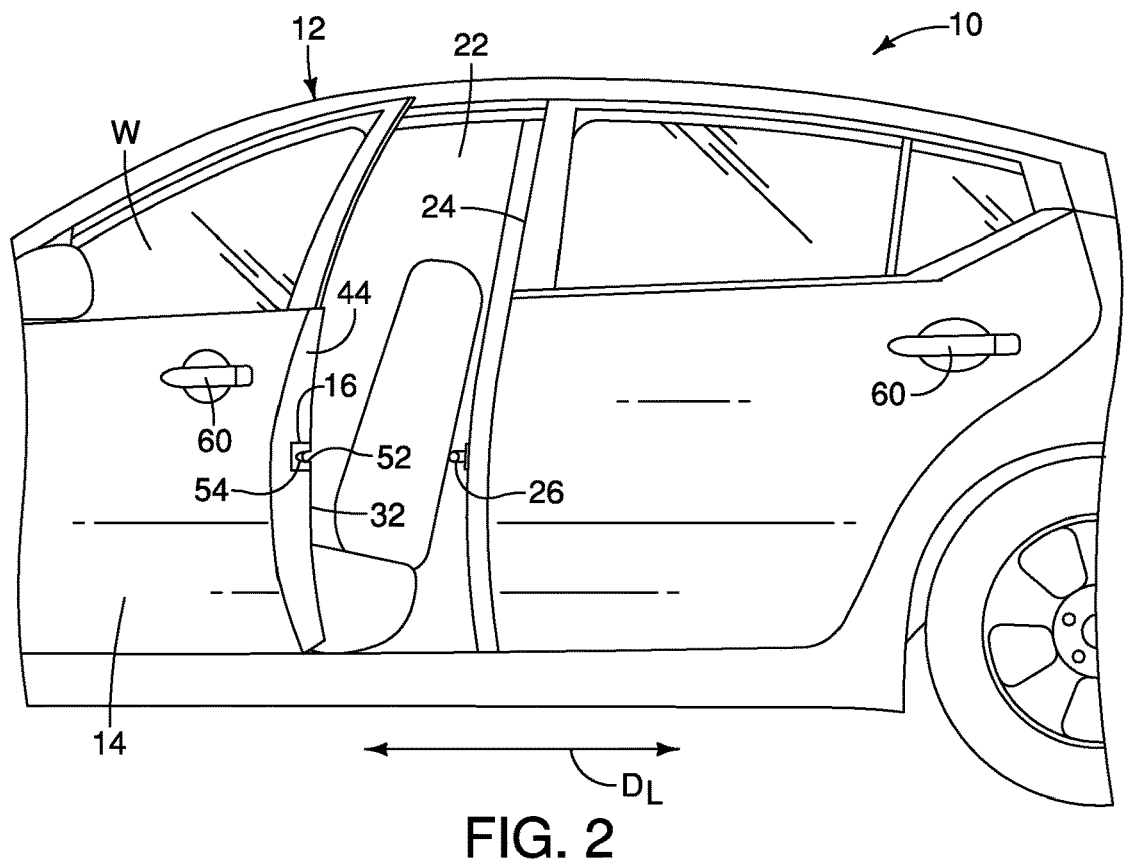
FIG. 2 is another side view of the vehicle showing the door structure in an open orientation in accordance with the exemplary embodiment.

Referring initially to FIGS. 1 and 2, a vehicle 10 is illustrated in accordance with a first embodiment that includes a vehicle body structure 12 that is defined by a door 14 with a door latch mechanism 16 (FIGS. 2-7) and a reinforcement member 18 (FIGS. 3-4 and 6-8). The reinforcement member 18 is provided with an attenuation member 20 (FIGS. 3, 8 and 10-11) attached to the reinforcement member 18 at a predetermined location such that in response to an impact event where impact energy applies sufficient force on a central exterior area of the door 14 deforming the door 14, the reinforcement member 18 also deforms and moves contacting a portion of the latch mechanism 16 thereby preventing the latch mechanism 16 from operating, as described in greater detail below.

The vehicle body structure 12, among other features, defines a passenger compartment 22 and a door opening 24 that provides access to the passenger compartment 22. The door 14 (also referred to as the door structure 14) is movable to and from each of a closed orientation (FIG. 1) and an open orientation (FIG. 2). As shown in FIG. 2, the vehicle body structure 12 further includes a latch striker 26 that is attached to, for example, the B-pillar of the vehicle body structure 12.

Figure 4:
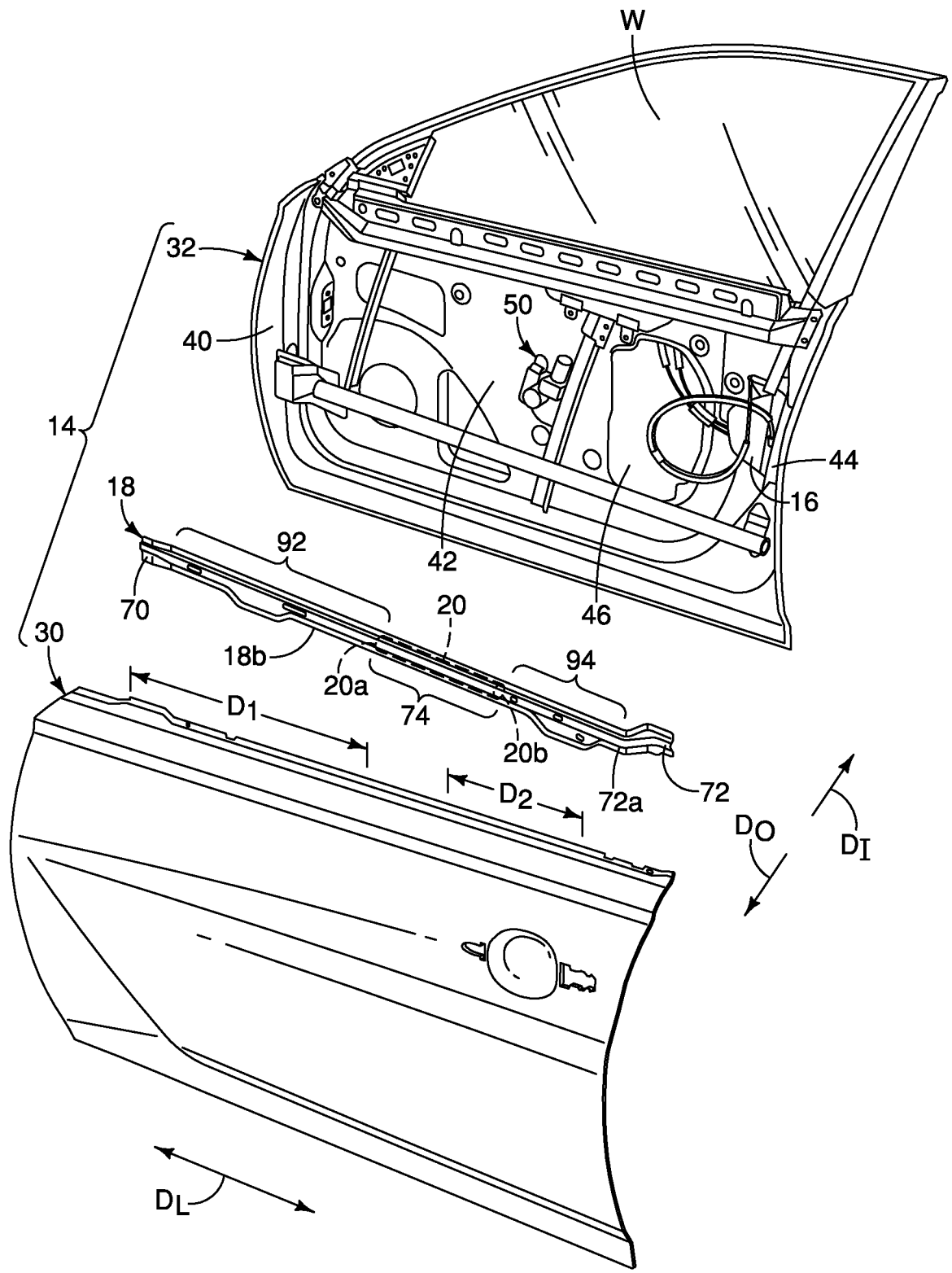
FIG. 4 is an exploded perspective view of the door structure showing an outer panel, an inner panel and the reinforcement member in accordance with the exemplary embodiment.

The vehicle body structure 12 defines a vehicle longitudinal direction, as shown in FIGS. 1, 2 and 4. The vehicle body structure 12 also defines vehicle inboard direction $D_1$ and vehicle outboard directions Do (only one of each shown in various drawings, such as FIG. 6) that are defined relative to a lengthwise center line (not shown) of the vehicle 10.

Figure 3:
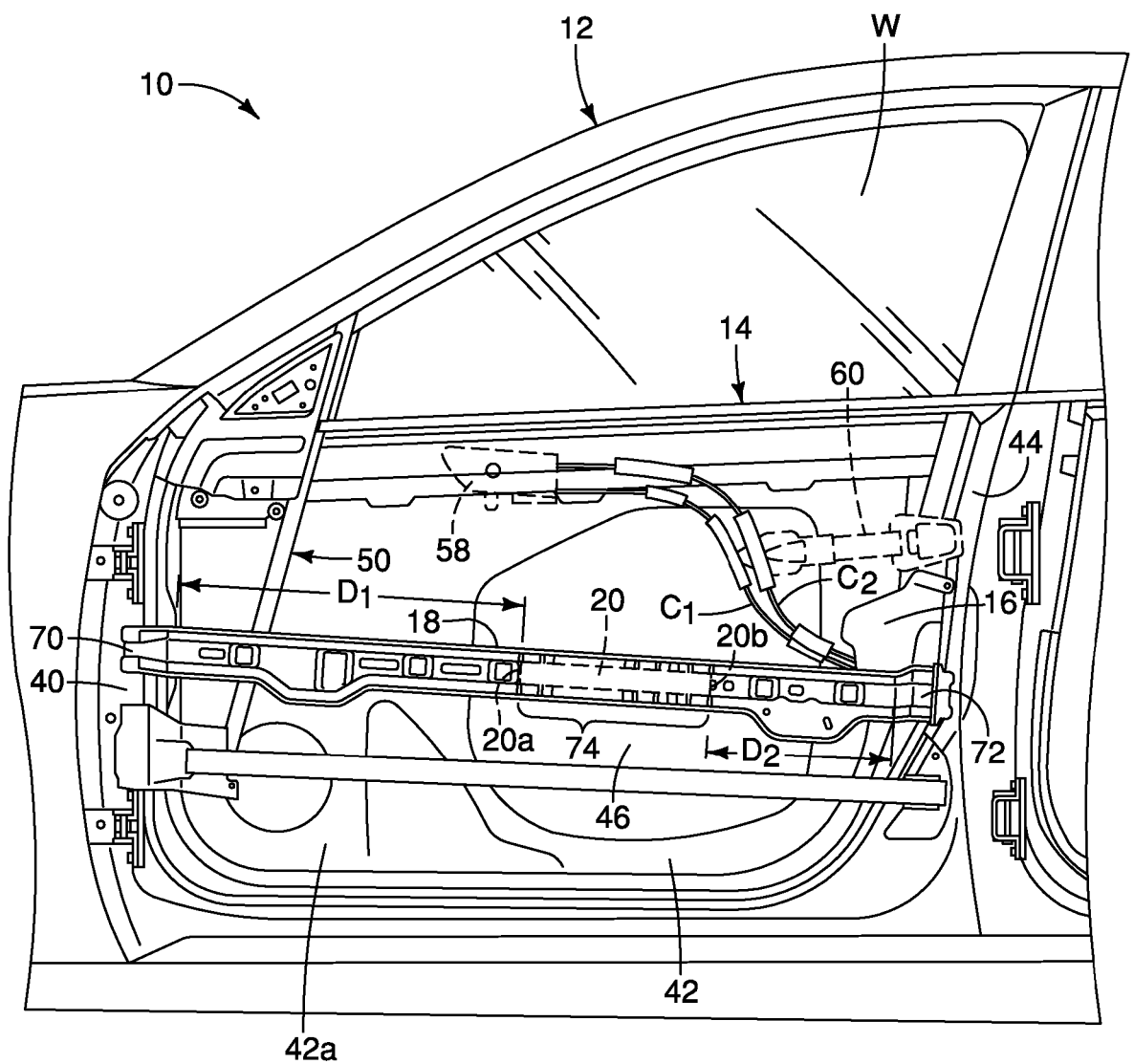
FIG. 3 is yet another side view of the vehicle with an outer panel of the door structure removed showing a latch mechanism and the reinforcement member in accordance with the exemplary embodiment.

As shown in FIGS. 3 and 4, the door 14 includes, among other features, an outer panel 30 (FIG. 4), an inner panel 32, the door latch mechanism 16 (also referred to as the latch mechanism 16) and the reinforcement member 18. The outer panel 30 (also referred to as the outer door panel 34) has an outer periphery defining forward, rearward and bottom edges that are welded or otherwise fixedly attached to corresponding peripheral portions of an outer periphery of the inner panel 32 (also referred to as the inner door panel 32).

Figure 5:
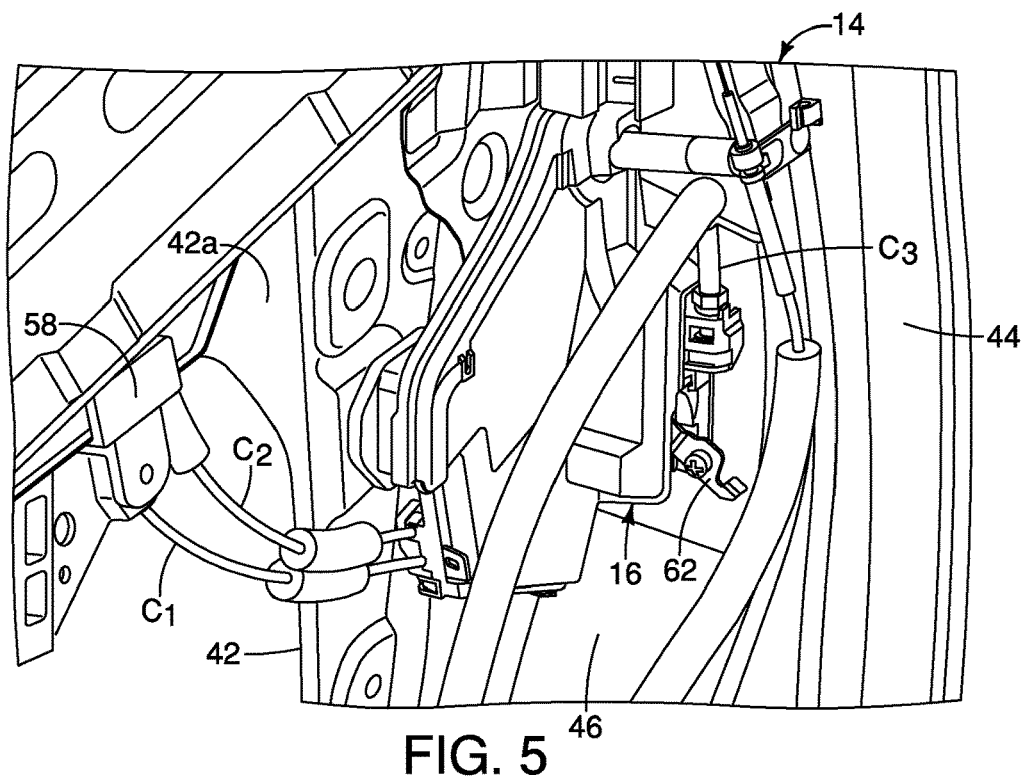
FIG. 5 is a perspective view of a portion of the inner panel with the outer panel removed showing the latch mechanism and an operation lever of the latch mechanism in accordance with the exemplary embodiment.

As shown in FIGS. 3-5, the inner panel 32 has a forward portion 40, a main wall 42 (an inboard wall) and a rearward portion 44. The forward portion 40 extends vertically along a forward end of the main wall 42. The rearward portion 44 extends vertically along a rearward end of the main wall 42. The forward portion 40 extends in an outboard direction and the rearward portion 44 extend away from the main wall 42 thereby defining a recessed area 46 along an outboard side 42a of the main wall 42 between the rearward portion 44 and the forward portion 40. With the outer door panel 34 attached to the inner door panel 36, the recessed area 46 defines a hollow interior of the door 14.

The door 14 includes a window regulator 50 that is at least partially disposed within the recessed area 46 of the inner door panel 36. The window regulator 50 includes a glass window W that is movable up from within the recessed area 46 through a gap between the upper edges of the outer panel 30 and the inner panel 32. The window regulator 50 is positioned between the main wall 42 of the inner door panel 36 and the reinforcement member 18. Since vehicle window regulators and operation of window regulators are conventional features of a vehicle, further description is omitted for the sake of brevity.

As shown in FIGS. 3-5, the latch mechanism 16 is installed to a rearward area of the inner door panel 32 adjacent to the rearward portion 44 of the inner door panel within the recessed area 46 (the hollow interior of the door 14). As shown in FIG. 2, the rearward portion 44 of the inner door panel 32 includes a slot 52. A portion of the latch mechanism 16 is visible in the slot 52. The latch mechanism 16 includes a latch plate 54 that pivots in a first direction to catch the latch striker 26 of the door opening 24 of the vehicle body structure 12. The latch plate 54 pivots in an opposite direction to release the latch striker 26 allowing the door 14 to open in a conventional manner. Since latch plates and latch strikers of latch mechanisms are conventional mechanical structures, further description is omitted for the sake of brevity.

The latch mechanism 16 is configured such that in a latching orientation the latch mechanism 16 retains the door 14 in the closed orientation (FIG. 1) and in a release orientation the door 14 can move to the open orientation (FIG. 2).

Figure 6:
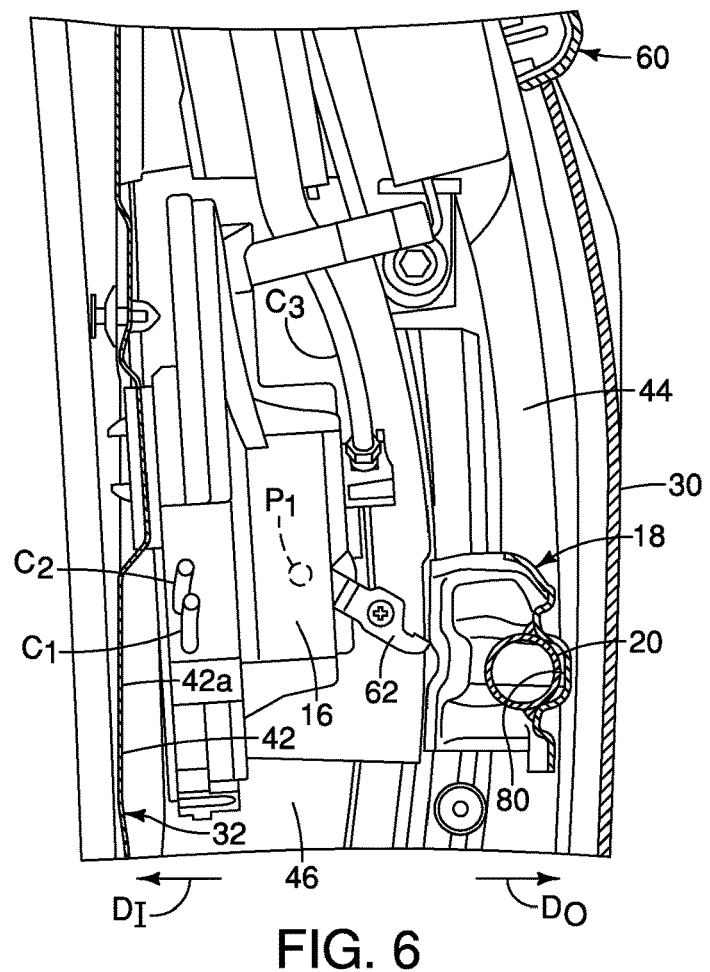
FIG. 6 is a cross-sectional view of the door showing the latch mechanism and the operation lever of the latch mechanism with the operation lever in an orientation corresponding to the door closed orientation in accordance with the exemplary embodiment.

As shown in FIGS. 3 and 5, the latch mechanism 16 is operably connected via cables $C_1$ and $C_2$ to an interior latch handle 58. As shown in FIGS. 5 and 6, the latch mechanism 16 is operably connected to an exterior latch handle 60 via a cable $C_3$. When either one of the interior latch handle 58 or the exterior latch handle is pulled, movement of a wire within a corresponding one of the cables $C_1$, $C_2$ and $C_3$ causes an operation lever 62 to pivot upward from a latched position shown in FIG. 6 to the position in FIG. 7 about a pivot shaft $P_1$. When the operation lever 62 is in the latched position shown in FIG. 6, the latch mechanism 16 (and the latch plate 54) is such that the door 14 is retained in the closed orientation. When the operation lever 62 is in the position shown in FIG. 7, the latch mechanism 16 (and the latch plate 54) is such that the door 14 can move freely to the open orientation.

In other words, the operation lever 62 is operably connected to the latch handles 58 and 60 such that with each the latch handles 58 and 60 in an at rest orientation the latch mechanism 16 can remain in the latching orientation if already in the latching orientation. With either one of the latch handles 58 and 60 moved to a door opening orientation the operation lever 62 is moved upward as shown in FIG. 7 causing the latch mechanism 16 to move to the open orientation allowing the door 14 to open.

Figure 7:
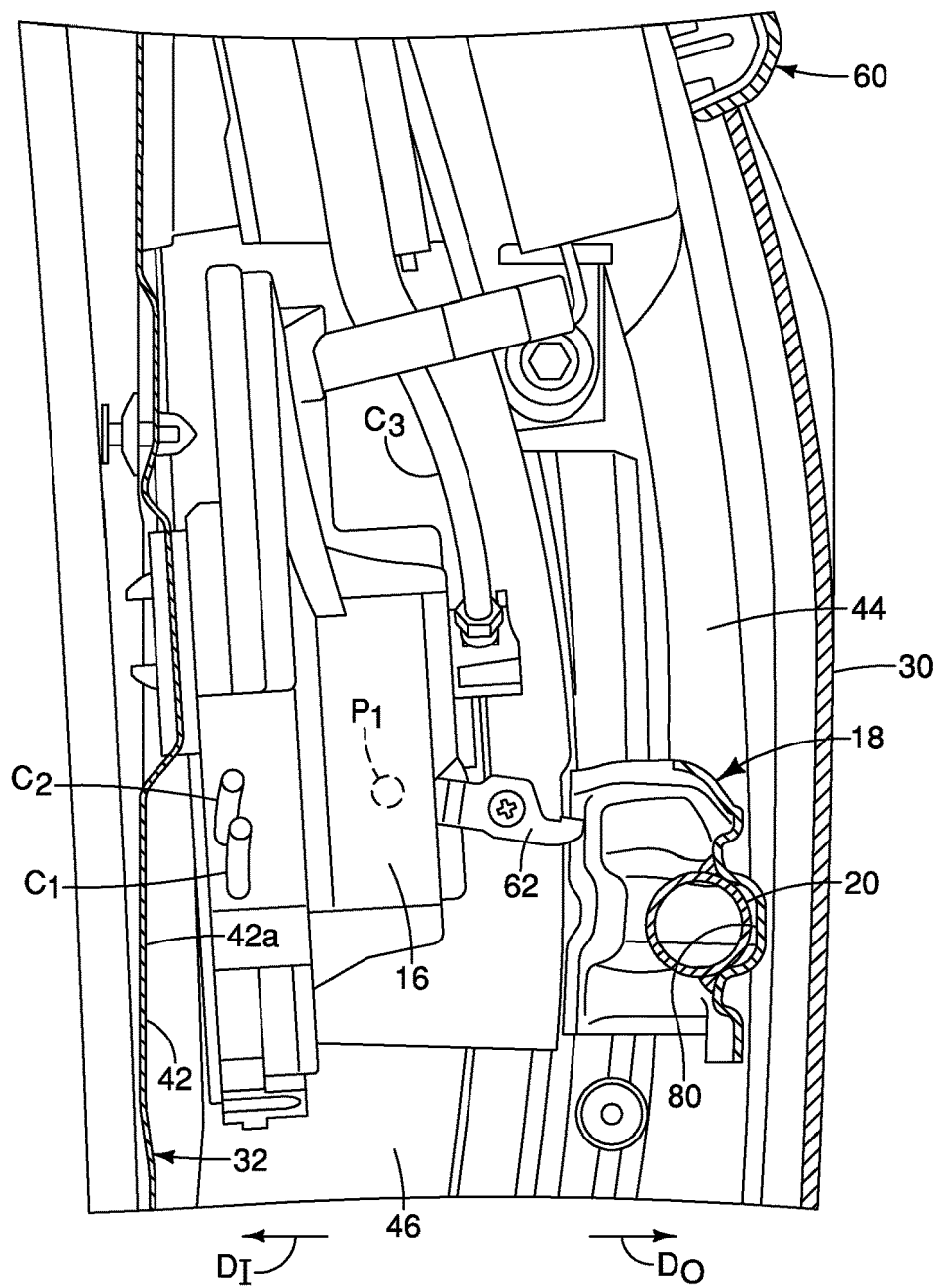
FIG. 7 is another cross-sectional view of the door showing the latch mechanism and the operation lever of the latch mechanism with the operation lever in an orientation corresponding to the door open orientation in accordance with the exemplary embodiment; in accordance with the exemplary embodiment.

The latch mechanism 16 is installed to the rearward portion 44 of the inner panel 32 within the recessed area 46 of the door 14 such that the operation lever 62 extends in an outboard direction toward the reinforcement member 18, as shown in FIGS. 6 and 7. Operation and function of door latch mechanisms such as the latch mechanism 16 are conventional and well known in the art. Therefore, further description of the latch mechanism 16 is omitted for the sake of brevity.

The reinforcement member 18 (FIGS. 3-4 and 6-14) of the door 14 has a forward end 70, a rearward end 72, a central area 74 and the attenuation member 20 (also referred to as the secondary reinforcement member 20). The forward end 70 is fixedly attached to the forward portion 40 of the inner panel 32 by mechanical fasteners (not shown) or welding techniques. The rearward end 72 is fixedly attached to the rearward portion 44 of the inner panel 32 by mechanical fasteners (not shown) or welding techniques.

A portion 72a of the rearward end 72 covers a section of the latch mechanism 16 adjacent to the rearward portion 44 of the inner panel 32. More specifically, the section of the latch mechanism 16 includes the operation lever 62. In other words, the operation lever 62 of the latch mechanism 16 is positioned such that at least the portion 72a of the rearward portion 72 of the reinforcement member 18 is outboard and level with the operation lever 62 of the latch mechanism 16. As shown in FIGS. 6 and 7, in a normal state (with no deformation of the door 14) the operation lever 62 is free to move back and forth between the two different positions of the lever 62 shown in FIGS. 6 and 7.

Figure 12:
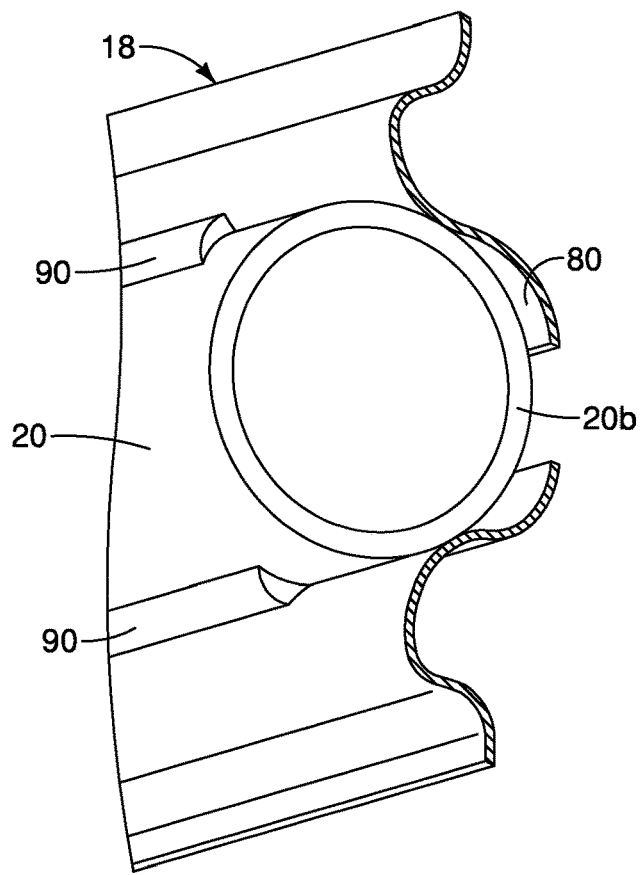
FIG. 12 is a perspective cross-sectional view of the reinforcement member showing the attenuation member welded thereto in accordance with the exemplary embodiment.
Figure 13:
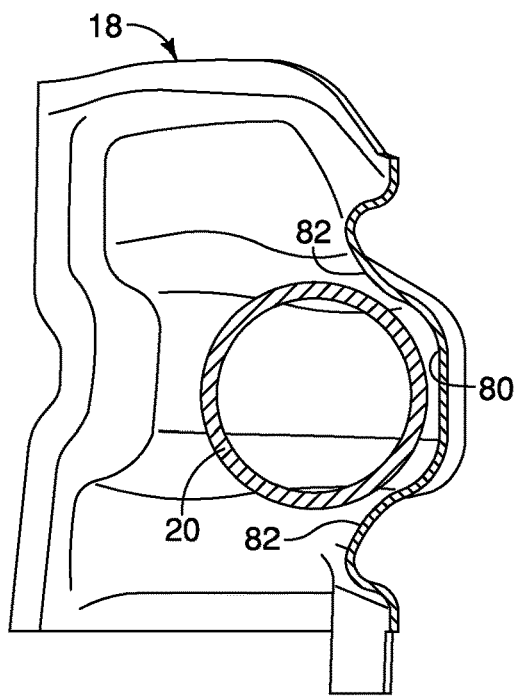
FIG. 13 is a front cross-sectional view of the reinforcement member with the attenuation member fitted into the recessed area prior to welding in accordance with the exemplary embodiment.
Figure 14:
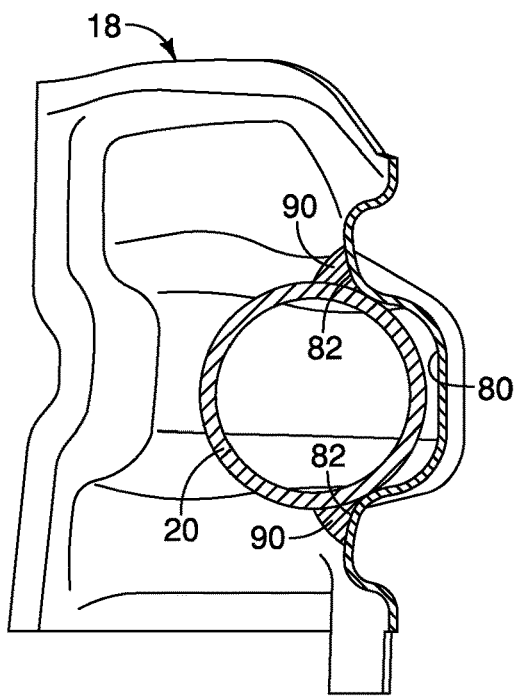
FIG. 14 is another front cross-sectional view of the reinforcement member with the attenuation member fitted into the recessed area and welded thereto in accordance with the exemplary embodiment.

As shown in FIGS. 12-14, the central area 74 of the reinforcement member 18 has a serpentine-like shape in cross-section that defines a recessed area 80 that extends along an inboard side 18a. The secondary reinforcement member 20 (the attenuation member 20) is fixedly installed within the recessed area 80.

The recessed area 80 of the reinforcement member includes contoured sections that define welding locations 82 for welding the secondary reinforcement member 20 (attenuation member 20) to the reinforcement member 18. The welding locations 82 (contoured sections 82) can be indentations formed on the surface of the recessed area 80 at the central area 74 of the reinforcement member 18 or can be roughed up surface sections that can readily adhere to welds. The attenuation member 20 is installed within the recessed area 80 at the central area 74 of the reinforcement member 18 and is then welded via welds 90 at the welding locations 82 to the reinforcement member 18. The welds 90 can be made using any of a variety of welding techniques. However, in the depicted embodiment, the attenuation member 20 (the secondary reinforcement member 20) is welded to the reinforcement member 18 using a MIG welding technique (where MIG is an acronym designating a metal inert gas welding process).

The positioning of the attenuation member 20 is determined based upon the overall length of the reinforcement member 18 and the deformation characteristics of the reinforcement member 18. The reinforcement member 18 defines a forward section 92 that extends from proximate the forward end 70 to a forward end 20a of the attenuation member 20. The reinforcement member 18 also defines a rearward section 94 that extends from proximate the rearward end 20b of the attenuation member 20 to the rearward end 72 of the reinforcement member 18.

Figure 8:
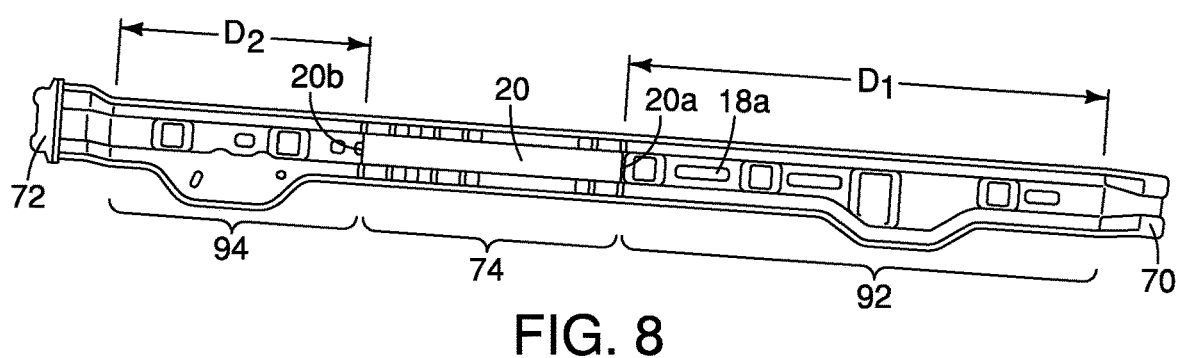
FIG. 8 is a side view of the reinforcement member shown removed from the vehicle and rotated about a horizontally extending axis showing an inboard side of the reinforcement member and an attenuation member (a secondary reinforcement member) in accordance with the exemplary embodiment.
Figure 9:
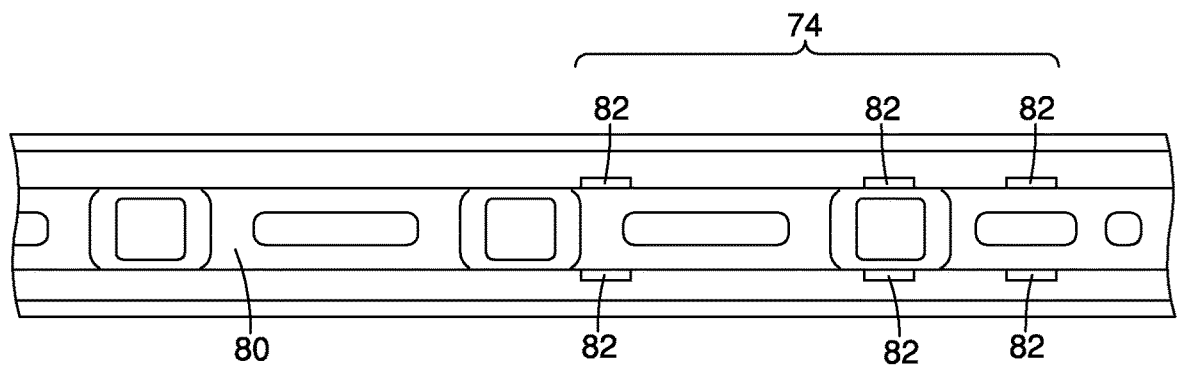
FIG. 9 is a side view of inboard side the reinforcement member with the attenuation member (the secondary reinforcement member) removed therefrom showing a recessed area of the reinforcement member and welding locations adjacent to the recessed area in accordance with the exemplary embodiment.
Figure 10:
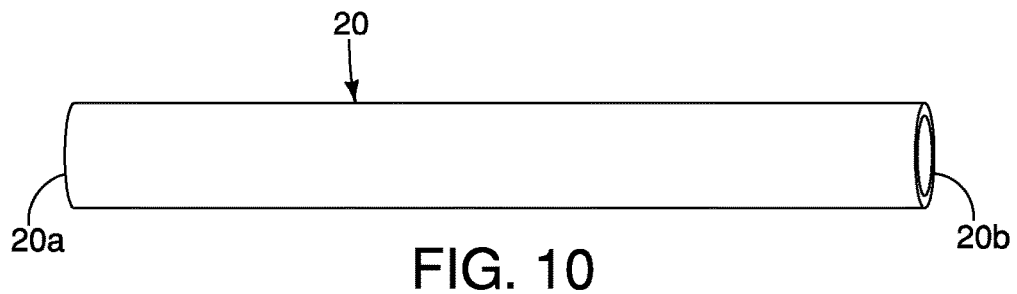
FIG. 10 is a side view of the attenuation member shown removed from the reinforcement member in accordance with the exemplary embodiment.
Figure 11:
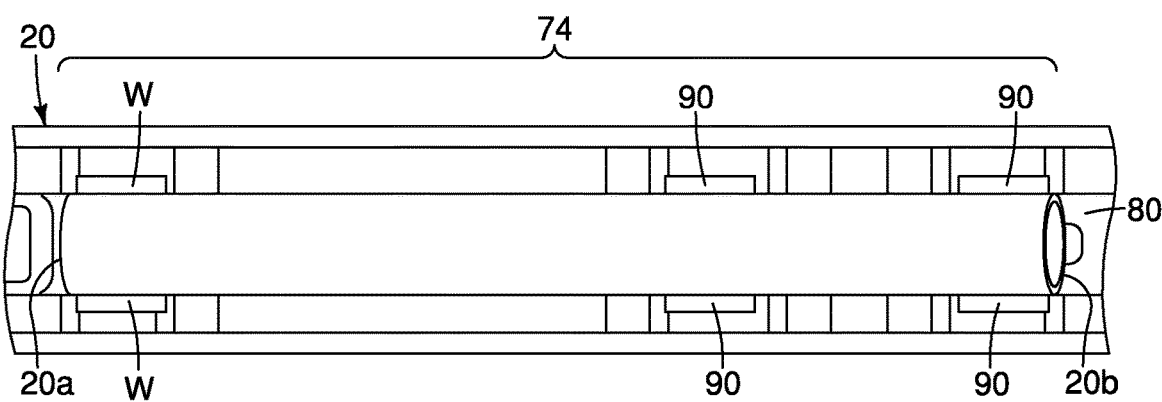
FIG. 11 is a side view of the reinforcement member with the attenuation member welded thereto in accordance with the exemplary embodiment.

The forward end 70 of the reinforcement member 18 is spaced apart from the forward end 20a of the attenuation member 20 by a first distance $D_1$. The rearward end 72 of the reinforcement member 18 is spaced apart from the rearward end 20b of the attenuation member 20 by a second distance D2. As shown in FIGS. 3, 4 and 8, the first distance $D_1$ is greater than the distance D2. Correspondingly, the forward section 92 of the reinforcement member 18 is longer than the rearward section 94 of the reinforcement member 18.

Figure 15:
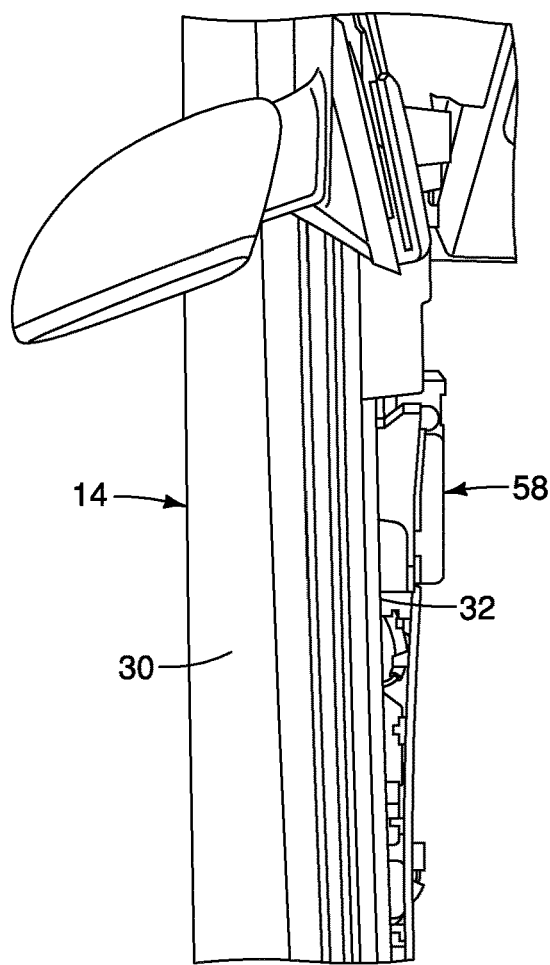
FIG. 15 is a top view of the door with an interior latch handle installed to an interior surface of the door and operably connected to the latch mechanism showing the interior latch handle in a latched orientation in accordance with the exemplary embodiment.
Figure 16:
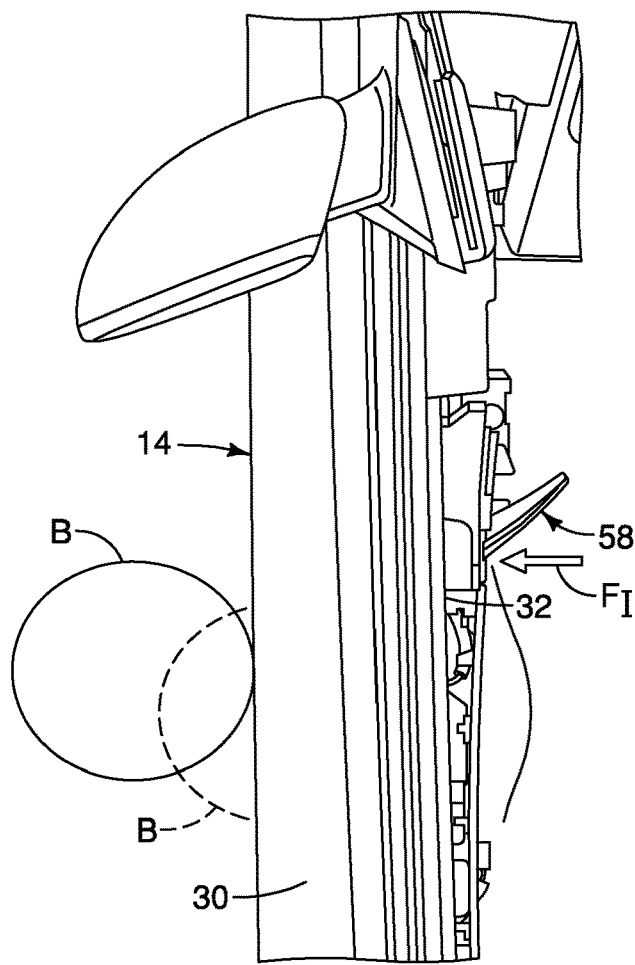
FIG. 16 is another top view of the door showing the interior latch handle of the door moved to the door opening orientation by an object (not shown) that applies a force against the interior latch handle in response to a barrier applying an impact force to an exterior of the door while in accordance with the exemplary embodiment.

FIGS. 15 and 16 show the door 14 in two different states. In FIG. 15, the door 14 is shown in a non-impacted or normal state with the door 14 in a closed orientation. Further, the interior latch handle 58 is shown in an at rest or door latched orientation. FIG. 16 shows the door 14 with a barrier B that represents an impact force being applied to the door 14 in a representation of an impact event where the barrier B contacts the door 14 proximate a central area of the door 14. No deformation of the door 14 is shown, but, when the barrier B is in the position relative to the door 14 as shown in phantom lines, the door 14 has deformed in response to the impact event.

In response to the impact event where force is directed to a central area of the door 14 (the door structure 14), an object or objects Fi contacting a rearward area of the interior latch handle 58 from within the passenger compartment 22 can cause the interior latch handle 58 to move to a door opening orientation, as shown in FIG. 16. The object or objects (represented by the force Fi) can be items held by a vehicle operator, an object in the passenger compartment, or a vehicle component such as, for example, a steering wheel of the vehicle. In order to prevent the door 14 from opening during such an impact event, the reinforcement member 18 and the attenuating member 20 are designed to prevent the latch mechanism 16 from releasing the door 14 from the latch striker 26, as described below.

As described above, the operation lever 62 is a trigger for operating the latch mechanism 16 to release the door 14 from the door closed orientation (FIG. 1) and to the door opened orientation (FIG. 2). Operation of either the exterior latch handle 60 or the interior latch handle 58 pulls the operation lever 62 upward, as shown in FIG. 7. During the impact event, as the door 14 is impacted by the barrier B, force is received along an outboard side 18b of the reinforcement member 18. As a result, the reinforcement member 18 deforms and contacts the lever 62 of the latch mechanism 16 retaining the latch mechanism 16 in the latching orientation, as shown in the timed sequence of images depicted in FIGS. 17-24.

Specifically, FIGS. 3 and 4 show the reinforcement member 18 in a non-deformed state (an at rest state or normal state). As shown in FIG. 16, when the door 14 is moved to impact the barrier B (or the barrier B is moved to impact the door 14), the barrier B is provided with sufficient mass and is in a position to deform the door 14. No deformation of the door 14 is shown in FIG. 16, but relative movement of the barrier B into the door 14 as represented by movement of the barrier B from the solid line position to the phantom line position clearly indicates that the door 14 and the reinforcement member 18 will undergo some deformation moving the central area of the door 14 and the central area 74 in the inboard $D_1$ direction relative to the vehicle 10. As long as the door 14 remains in the closed orientation with the latch mechanism 16 gripping the latch striker 16, at least a portion of the impacting force is absorbed by the B-pillar of the vehicle 10.

Figure 17:
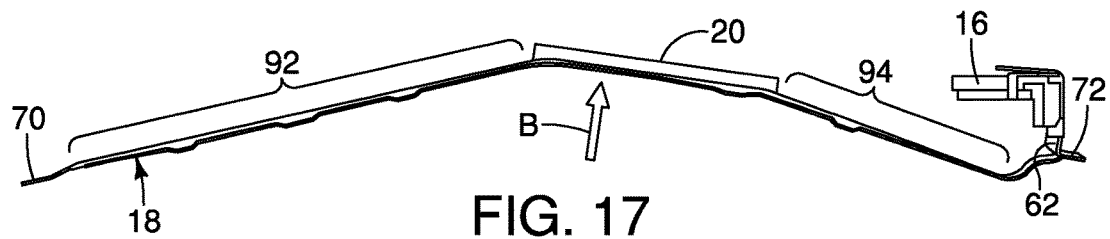
FIG. 17 is a top view of the reinforcement member, the attenuation member and the latch mechanism with other elements of the door removed showing deformation of the reinforcement member at 15 ms (milli-seconds) after the start of an impact event in accordance with the exemplary embodiment.
Figure 18:
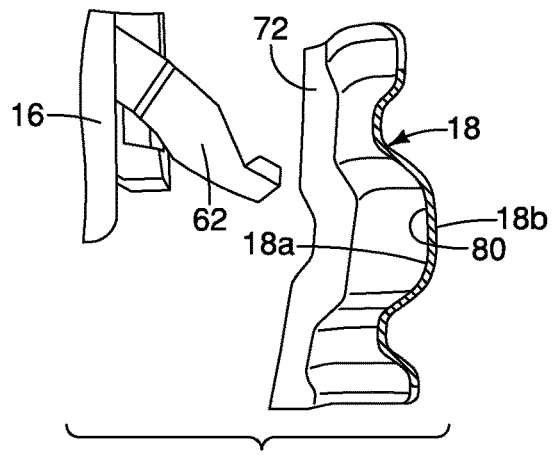
FIG. 18 is a front cross-sectional view of the latch mechanism, the lever of the latch mechanism and a rearward portion of the reinforcement member at 15 ms after the start of the impact event showing deformation of the reinforcement member corresponding to the deformation depicted in FIG. 17 in accordance with the exemplary embodiment.

FIGS. 17 and 18 show deformation of the reinforcement member 18 at 15 ms (milli-seconds) after the barrier B first impacts the door 14 and begins to deform the door 14 and the reinforcement member 18. FIG. 17 shows that the central area of the reinforcement member 18 corresponding to the location of the attenuation 20 does not deform, but rather stays straight. The forward section 92 and the rearward sections 94 have bent at their respective ends such that a rearmost area of the reinforcement member 18 at the rearward end 72 bends in an inboard direction.

Figure 19:
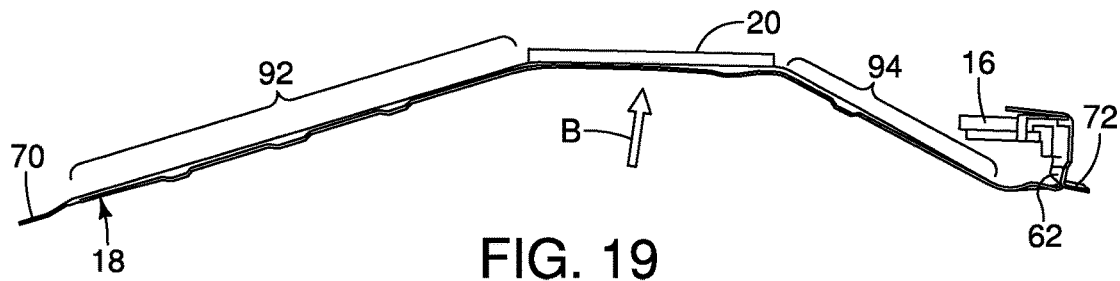
FIG. 19 is another top view of the reinforcement member, the attenuation member and the latch mechanism similar to FIG. 17 showing deformation of the reinforcement member at 25 ms (milli-seconds) after the start of the impact event in accordance with the exemplary embodiment.
Figure 20:
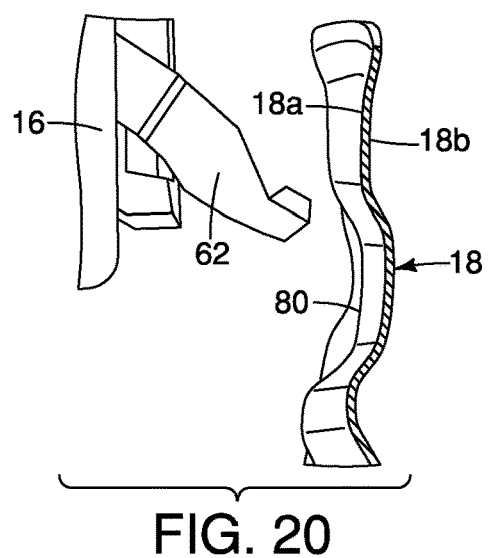
FIG. 20 is another front cross-sectional view of the latch mechanism, the lever of the latch mechanism and the rearward portion of the reinforcement member at 25 ms after the start of the impact event showing deformation of the reinforcement member corresponding to the deformation depicted in FIG. 19 in accordance with the exemplary embodiment.

Similarly, FIGS. 19 and 20 show deformation of the reinforcement member 18 at 25 ms (milli-seconds) after the barrier B first impacts the door 14. The reinforcement member 18 is shown to have undergone further deformation. Specifically, in FIG. 20 the central area of the reinforcement member 18 at the attenuation 20 continues to stay straight. Further, the rearward sections 94 has undergone further movement such that the rearmost area of the reinforcement member 18 at the rearward end 72 has clearly further bent in the inboard direction and is approaching the lever 62.

Figure 21:
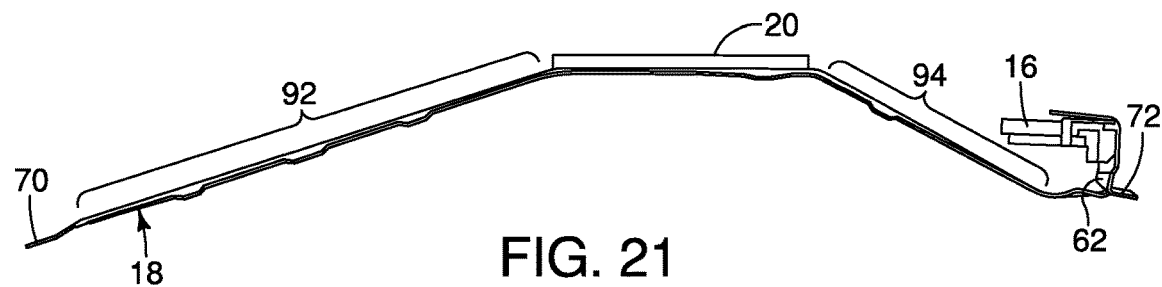
FIG. 21 is still another top view of the reinforcement member, the attenuation member and the latch mechanism similar to FIGS. 17 and 19 showing deformation of the reinforcement member at 30 ms (milli-seconds) after the start of the impact event in accordance with the exemplary embodiment.
Figure 22:
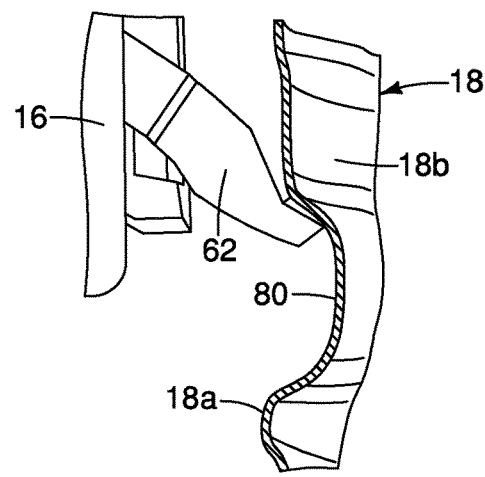
FIG. 22 is still another front cross-sectional view of the latch mechanism, the lever of the latch mechanism and the rearward portion of the reinforcement member at 30 ms after the start of the impact event showing deformation of the reinforcement member corresponding to the deformation depicted in FIG. 21 in accordance with the exemplary embodiment.

FIGS. 21 and 22 show deformation of the reinforcement member 18 at 30 ms (milli-seconds) after the barrier B first impacts the door 14. Both FIGS. 21 and 22 shown that the rearward section 94 has undergone further movement such that the rearmost area of the reinforcement member 18 at the rearward end 72 has bent in the inboard direction and is in contact with the lever 62.

Figure 23:
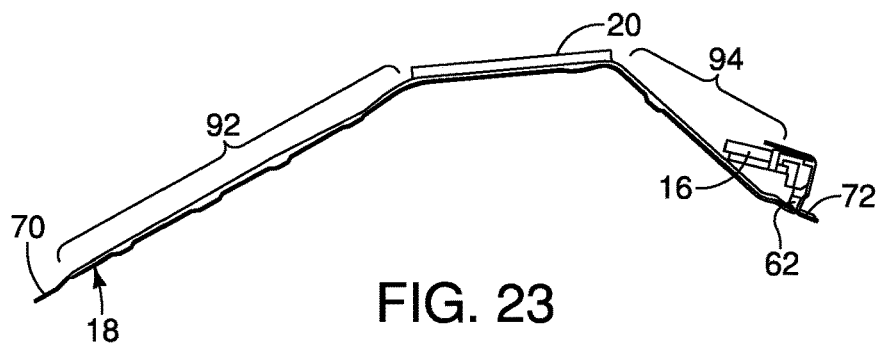
FIG. 23 is yet another top view of the reinforcement member, the attenuation member and the latch mechanism similar to FIGS. 17, 19 and 21 showing deformation of the reinforcement member at 50 ms (milli-seconds) after the start of the impact event in accordance with the exemplary embodiment.
Figure 24:
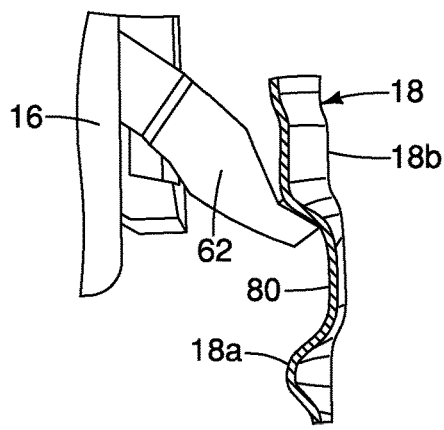
FIG. 24 is yet another front cross-sectional view of the latch mechanism, the lever of the latch mechanism and the rearward portion of the reinforcement member at 50 ms after the start of the impact event showing deformation of the reinforcement member corresponding to the deformation depicted in FIG. 23 in accordance with the exemplary embodiment.

FIGS. 23 and 24, show the deformation of the reinforcement member 18 at 50 ms (milli-seconds) after the barrier B first impacts the door 14. Both FIGS. 21 and 22 shown that the rearward section 94 has undergone even further movement such that the rearmost area of the reinforcement member 18 at the rearward end 72 has bent further in the inboard direction and is now in firm contact with the lever 62.

Hence, in less than 50 ms, the impact force of the barrier B contacting the door 14 is such that the reinforcement member 18 firmly contacts the lever 62 preventing the latch mechanism 16 from operating, thereby keeping the door 14 in the closed orientation. The reinforcement member 18 basically traps and confines the lever 62 preventing it from moving within 50 ms from the start of the impact event. Consequently, even if one of the interior latch handle 58 and/or the exterior latch handle 60 is operated, opening of the door 14 is prevented by the rapid movement of the reinforcement member 18 against the lever 62, preventing the lever 62 from moving.

Further, the latch mechanism 16 is engaged with the latch striker 26 on the B-pillar of the vehicle 10, thereby enabling the B-pillar to absorb a significant amount of the impacting force.

The presence of the attenuation member 20 (the secondary reinforcement member 20) on the reinforcement member 18 makes the above described deformation possible in less than 50 ms. Specifically, with the attenuation member 20 welded to the central area 74 of the reinforcement member 18, the reinforcement member 18 can deform such that there is contact between the rearward end 72 of the reinforcement member 18 with the lever 62 of the latch mechanism 16. This contact prevents the latch mechanism 16 from operating to open the door 14 even when the interior latch handle 58 is moved to open the door 14. Tests conducted by the inventors show that in the absence of the attenuation member 20, such deformation of the reinforcement member 18 at the rearward end 72 does not cause contact between the rearward end 72 of the reinforcement member 18 and the lever 62 of the latch mechanism 16 within 50 ms from the beginning of the impact event. Rather, little or no contact is made between the rearward end 72 of the reinforcement member 18 and the lever 62 of the latch mechanism 16 in the absence of the attenuation member.

Depending upon the size of the door 14, the relative size and length of the reinforcement member 18 and the overall design of the vehicle 10, the attenuation member 20 can be lengthened or shortened to achieve a desired deformation of the reinforcement member 18 to prevent operation of the latch mechanism 16 (prevent movement of the lever 62).

As can be ascertained by studying FIGS. 17-24, the inclusion of the attenuation member 20 prevents deformation of the central area 74 of the reinforcement member 18 during an impact event. The basic physics and kinematics of the geometry of the reinforcement member 18 and the attenuation member 20 are such that the presence of the attenuation member 20 increases the bending forces at either end of the reinforcement member 18 because the deformation of the reinforcement member 18 is altered by the inclusion of the attenuation member 20. In other words, the attenuation member 20 prevents or at least reduces the central area 74 of the reinforcement member 18 ability to deform (changes its deformation characteristics).

The vehicle 10 includes many features and components that are conventional components that are well known in the art. Since such features and components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device includes structure is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
    a door structure having an inner door panel and a reinforcement member installed to the inner door panel, the door structure being movable to and from each of a closed orientation and an open orientation when installed to a vehicle;
    a latch mechanism installed to a rearward area of the inner door panel, the latch mechanism being configured such that in a latching orientation the latch mechanism retains the door structure in the closed orientation and in a release orientation the door structure can move to the open orientation, the latch mechanism being positioned such that at least a section of a rearward portion of the reinforcement member is outboard and level with a portion of the latch mechanism; and
    an attenuation member fixedly attached to a central area of the reinforcement member spaced apart from the rearward area of the inner door panel and spaced apart from a forward area of the inner door panel such that in response to an impact event where force is directed to a central area of the door structure, the reinforcement member deforms and contacts the latch mechanism retaining the latch mechanism in the latching orientation, and
    the reinforcement member of the door structure has a recessed area that extends along at least a portion of an inboard side thereof with the attenuation member being fixedly installed within the recessed area.

2. The vehicle body structure according to claim 1, wherein
    the latch mechanism includes an operation lever operably connected to a latch handle such that with the latch handle in an at rest orientation the latch mechanism can remain in the latching orientation if already in the latching orientation and with the latch handle moved to a door opening orientation the latch mechanism is moved to the open orientation.

3. The vehicle body structure according to claim 2, wherein
    in response to an impact event where force is directed to the central area of the door structure, the reinforcement member contacts the latch mechanism and the operation lever preventing movement of the operation lever to the door opening orientation.

4. The vehicle body structure according to claim 3, wherein
    the inner door panel of the door structure has a forward portion, a main wall and a rearward portion such that a recessed area is defined along an outboard side of the main wall between the rearward portion and the forward portion, with the latch mechanism being installed to the rearward portion within the recessed area.

5. The vehicle body structure according to claim 4, wherein
    the reinforcement member of the door structure has a forward end fixedly attached to the forward portion of the inner door panel and a rearward end fixedly attached to the rearward portion of the inner door panel such that a portion of the rearward end covers a section of the latch mechanism adjacent to the rearward portion of the inner door panel.

6. The vehicle body structure according to claim 5, wherein
    the attenuation member has a forward end and a rearward end, the forward end of the attenuation member being spaced apart from the forward end of the reinforcement member by a first distance, and the rearward end of the attenuation member being spaced apart from the rearward end of the reinforcement member by a second distance, the first distance being greater than the second distance.

7. The vehicle body structure according to claim 6, wherein
    the reinforcement member defines a forward section forward of the attenuation member, a central area defined along the attenuation member and a rearward section rearward of the attenuation member, and
    in response to an impact event where force is directed to the door structure in an area corresponding to the central area of the reinforcement member, the forward section and the rearward section of the reinforcement member deform and the central area of the reinforcement member undergoes little or no deformation as compared to deformation of the forward and rearward sections of the reinforcement member due to rigidity of the attenuation member.

8. The vehicle body structure according to claim 4, wherein
the door structure includes a window regulator that is at least partially disposed within the recessed area of the inner door panel, the window regulator being positioned between the main wall of the inner door panel and the reinforcement member.

9. The vehicle body structure according to claim 1, wherein
the inner door panel of the door structure has a forward portion, a main wall and a rearward portion such that a recessed area is defined along an outboard side of the main wall between the rearward portion and the forward portion, with the latch mechanism being installed to the rearward portion within the recessed area.

10. The vehicle body structure according to claim 9, wherein
the reinforcement member of the door structure has a forward end fixedly attached to the forward portion of the inner door panel and a rearward end fixedly attached to the rearward portion of the inner door panel such that a portion of the rearward end covers a section of the latch mechanism adjacent to the rearward portion of the inner door panel.

11. A vehicle body structure, comprising:
a door structure having an inner door panel and a reinforcement member installed to the inner door panel, the door structure being movable to and from each of a closed orientation and an open orientation when installed to a vehicle, the inner door panel of the door structure further has a forward portion, a main wall and a rearward portion such that a recessed area is defined along an outboard side of the main wall between the rearward portion and the forward portion;
a latch mechanism installed to a rearward area of the inner door panel, the latch mechanism being configured such that in a latching orientation the latch mechanism retains the door structure in the closed orientation and in a release orientation the door structure can move to the open orientation, the latch mechanism being positioned such that at least a section of a rearward portion of the reinforcement member is outboard and level with a portion of the latch mechanism, the latch mechanism being installed to the rearward portion within the recessed area; and
an attenuation member fixedly attached to a central area of the reinforcement member spaced apart from the rearward area of the inner door panel and spaced apart from a forward area of the inner door panel such that in response to an impact event where force is directed to a central area of the door structure, the reinforcement member deforms and contacts the latch mechanism retaining the latch mechanism in the latching orientation,
the reinforcement member of the door structure also has a forward end fixedly attached to the forward portion of the inner door panel and a rearward end fixedly attached to the rearward portion of the inner door panel such that a portion of the rearward end covers a section of the latch mechanism adjacent to the rearward portion of the inner door panel, and
the attenuation member has a forward end and a rearward end, the forward end of the attenuation member being spaced apart from the forward end of the reinforcement member by a first distance, and the rearward end of the attenuation member being spaced apart from the rearward end of the reinforcement member by a second distance, the first distance being greater than the second distance.

12. The vehicle body structure according to claim 11, wherein
the reinforcement member defines a forward section forward of the attenuation member, a central area defined along the attenuation member and a rearward section rearward of the attenuation member, and
in response to an impact event where force is directed to the door structure in an area corresponding to the central area of the reinforcement member, the forward section and the rearward section of the reinforcement member deform and the central area of the reinforcement member undergoes little or no deformation as compared to deformation of the forward and rearward sections of the reinforcement member due to rigidity of the attenuation member.

13. The vehicle body structure according to claim 1, wherein
the inner door panel of the door structure has a forward portion, a main wall and a rearward portion such that a recessed area is defined along an outboard side of the main wall between the rearward portion and the forward portion, with the latch mechanism being installed to the rearward portion within the recessed area.

14. The vehicle body structure according to claim 13, wherein
the door structure includes a window regulator that is at least partially disposed within the recessed area of the inner door panel, the window regulator being positioned between the main wall of the inner door panel and the reinforcement member.

15. The vehicle body structure according to claim 11, wherein
the reinforcement member of the door structure has a recessed area that extends along at least a portion of an inboard side thereof with the attenuation member being fixedly installed within the recessed area.

16. The vehicle body structure according to claim 15, wherein
the attenuation member is welded to the reinforcement member within the recessed area.

17. The vehicle body structure according to claim 16, wherein
the attenuation member is welded to the reinforcement member using MIG welding.

18. The vehicle body structure according to claim 16, wherein
the recessed area of the reinforcement member includes contoured sections defining welding locations for welding the attenuation member to the reinforcement member.

19. The vehicle body structure according to claim 1, wherein
the attenuation member is welded to the reinforcement member within the recessed area.

20. The vehicle body structure according to claim 19, wherein
the attenuation member is welded to the reinforcement member using MIG welding.

\* \* \* \* \*